United States Patent [19]

Beesley

[11] 4,174,585

[45] Nov. 20, 1979

[54] LIVE BAIT CARRIER FOR FISHERMEN AND THE LIKE

[76] Inventor: Lawrence Beesley, 1095 E. Oakland Ave., Hemet, Calif. 92343

[21] Appl. No.: 864,524

[22] Filed: Dec. 27, 1977

[51] Int. Cl.² .......................................... A01K 97/04
[52] U.S. Cl. .......................................... 43/55; 150/10
[58] Field of Search ............... 43/54.5 R, 55; 150/10, 150/3

[56] References Cited

U.S. PATENT DOCUMENTS

| | | | |
|---|---|---|---|
| 1,116,068 | 11/1914 | Jackson | 150/10 X |
| 1,284,579 | 11/1918 | Brown | 43/55 X |
| 2,562,636 | 7/1951 | Odneal | 43/54.5 R |
| 2,780,887 | 2/1957 | Cabaniss | 43/55 |
| 3,143,263 | 8/1964 | Farmer | 43/55 X |
| 3,181,267 | 5/1965 | Sawyer et al. | 43/55 |
| 3,559,329 | 2/1971 | Chiu | 43/55 |
| 3,716,938 | 2/1973 | Ammons | 43/55 |

FOREIGN PATENT DOCUMENTS

| | | | |
|---|---|---|---|
| 816990 | 7/1969 | Canada | 43/55 |
| 353384 | 1/1930 | United Kingdom | 150/10 |

*Primary Examiner*—Nicholas P. Godici
*Assistant Examiner*—Robert P. Olszewski
*Attorney, Agent, or Firm*—John H. Crowe; Fred N. Schwend

[57] ABSTRACT

The carrier has a stiff wire bent to form belt-receiving loops and a frame for supporting a wire mesh fabric bait container having an opening therein. A flexible cloth fabric, such as the upper 4 to 6 inches of a man's heavy nylon stocking, covers the opening and has an access opening therein bordered by a pair of opposed lip portions. Tension springs secured to respective lip portions hold the lip portions together to normally close the access opening and thus prevent escape of the bait, while permitting ready access thereto.

3 Claims, 7 Drawing Figures

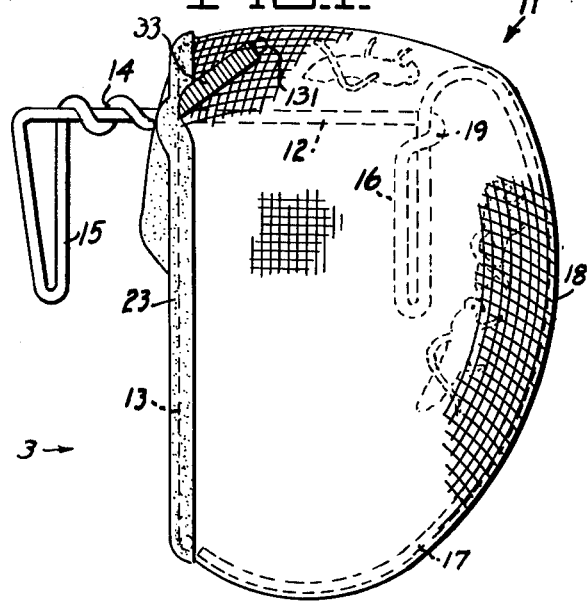
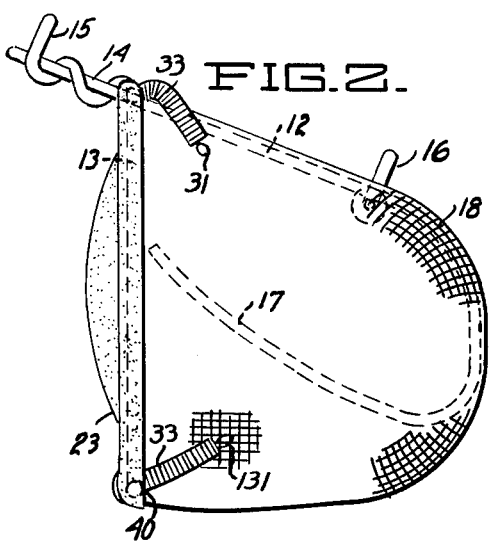
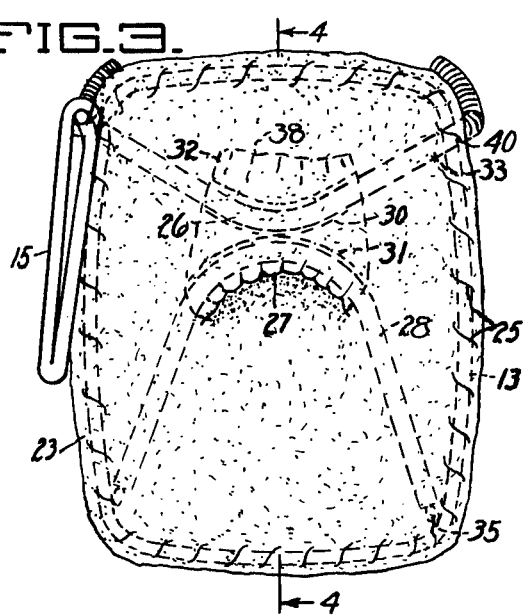
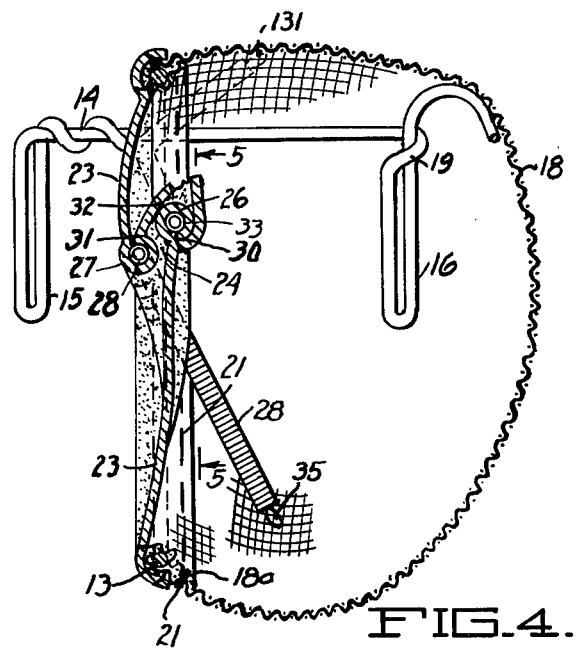
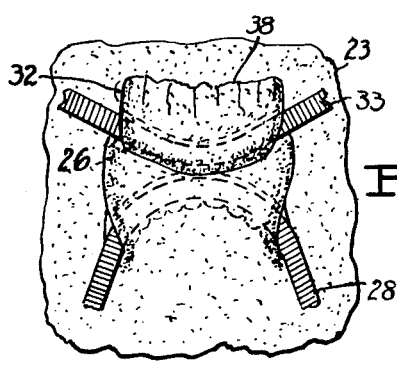

LIVE BAIT CARRIER FOR FISHERMEN AND THE LIKE

BACKGROUND OF THE INVENTION

1. Field of the Invention

This invention relates to the art of fishing and has particular reference to a container for carrying living bait.

2. Description of Prior Art Practice

In practicing the art of fishing, it is common to use living bait for lures. For example, live grasshoppers, trout flies, worms and the like are often used and these must be carried in some form of escape-proof container until needed. Heretofore, such containers have generally had an access opening which was normally closed by a pivoted or removable door or lid to prevent the escape of the live bait. Although such containers are generally satisfactory, there is always the possibility that when the lid is opened to remove one of the bait, others may escape.

SUMMARY OF THE INVENTION

A principal object of the present invention is to provide a live bait carrier with means to prevent escape of bait therefrom.

Another object is to provide a live bait carrier which permits ready access to certain of the bait therein while preventing escape of other bait therefrom.

Another object is to provide a live bait carrier of the above type which is simple and inexpensive to manufacture.

A further object is to provide a live bait carrier of the above type which is extremely light and can be carried on one's belt.

According to the present invention, a live bait carrier is provided comprising a container having an opening therein. The container is supported by a stiff wire element, bent to form a frame which is secured to the container and surrounds the opening. The wire element is also bent to form a pair of spaced loops whereby the carrier can be mounted on one's belt. A man's nylon stocking cut 4 to 6 inches from the top, or similar resiliently stretchable cloth fabric, is secured over the opening and has an access opening therein. Springs under tension are attached to opposite lip portions of the access opening to normally hold the lips in overlapping relation whereby to close the access opening and thus prevent escape of the bait, even while reaching through the access opening to select a particular bait.

BRIEF DESCRIPTION OF THE DRAWINGS

The manner in which the above and other objects of the invention are accomplished will be readily understood on reference to the following specification when read in conjunction with the accompanying drawings, wherein:

FIG. 1 is a side view of a live bait carrier embodying a preferred form of the present invention.

FIG. 2 is a top plan view of the carrier.

FIG 3 is a front view of the carrier and is taken in the direction of the arrow 3 in FIG. 1.

FIG. 4 is a sectional view through the carrier and is taken along line 4—4 of FIG. 3.

FIG. 5 is a sectional view, partly broken away, taken substantially along line 5—5 of FIG. 4.

DESCRIPTION OF THE PREFERRED EMBODIMENT

Figure 6:
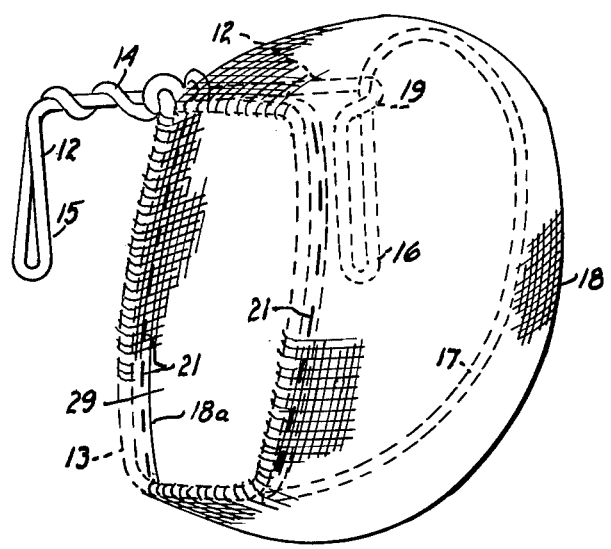
FIG. 6 is a perspective view of the container prior to mounting of the fabric cover thereon.

Referring to the drawings, the live bait carrier is generally indicated at 11 and comprises a relatively stiff rust-proof wire 12 bent at one end to form a substantially rectangular frame 13. The wire is then twisted on itself at 14 and formed into a belt-receiving loop 15. A horizontally extending portion of the wire is bent at 19 to form a second belt-receiving loop 16, spaced laterally from the loop 15. Finally, the wire 12 is bent into a curved formation 17 which forms a reinforcing structure for a container 18, preferably formed of relatively stiff open metal wire mesh or fabric, such as aluminum window screen material, having approximately sixteen strands per inch. The container 18 is of generally bulbous form and has an opening 29 therein at one side. The edge portion 18a of the wire mesh surrounding such opening is bent around the wire frame 13, as shown in FIGS. 4 and 6, and is attached to the remainder of the container by wire staples 21 to secure the container to the frame 13. The curved reinforcing formation 17 of the wire 12 engages around the interior of the container 18 to reduce the possibility of accidentally crushing the container.

A soft, flexible, resiliently stretchable fabric cover 23 of cloth, preferably formed of the upper 4 to 6 inches of a relatively thick man's nylon stocking, is secured over the opening 29 of the container 18 by stitching the same over the frame 13 after the container 18 has been stapled thereto, by using a suitable thread 25, such as relatively strong fishing line.

Figure 7:
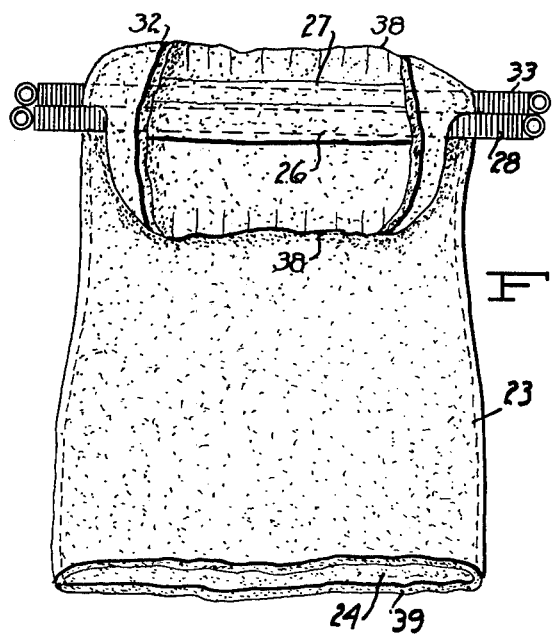
FIG. 7 is a front view of the fabric cover with springs attached thereto, prior to attachment to the container.

As will be noted in FIG. 7, the cover 23 is initially tubular, having an opening 24 therethrough. The lower edge 39 then is stretched outward to fit over the frame 13.

A pair of lips or lip portions 26 and 27 are formed in the upper end of the nylon stocking fabric or material 23. The lips extend across opposite sides of the opening 24, but are spaced approximately ¾ inches below the upper edge 38. The lip 26 is formed by wrapping a part of the nylon stocking around the mid portion of an elongate tension spring 33 and stitching the same along about two inches of the length of the spring, as indicated at 30. The lip 27 is likewise formed by wrapping a part of the nylon stocking, opposite lip 26, around a second tension spring 28, and stitching the same also along about two inches of the length of the spring 28, as indicated at 31.

When mounted on the container 18, the ends of the spring 33 diverge upwardly and outwardly and pass around the frame 13 at point 40 and are attached in tensioned condition to the upper outside of the container, as indicated at 131. On the other hand, the ends of the spring 28 extend downwardly and outwardly and are attached in tensioned condition to the lower side of the container at 35, thereby overlapping the lips 27 and 26 to close the opening 24 against escape of the bait.

It will be noted that when the springs 28 and 33 are mounted in the container in tensioned condition, they pucker or gather the portion 32 of the stocking material intermediate the lips 26, 27, and the edge 38 of the cover 23 into a soft ruffly formation to further close the opening 24, while preventing damage to any of the bait attempting to escape.

Although the springs 28 and 33 normally close the opening 24, the fisherman may readily insert his fingers between the lips 26 and 27, stretching them apart, to grasp a selected bait which he can readily see through the wire mesh of the container 18. In doing so, the springs 28 and 33 will close the lips 26 and 27 about his fingers to prevent the escape of any unselected bait and, as soon as he has withdrawn one of the bait, the springs will again return the lips and puckered fabric formation to close the opening 24.

In view of the resilient nature of the soft stocking material 23 and the springs 28 and 33, the fisherman can readily move his fingers, while inserted in the opening 24, to reach any part of the container 18. In doing so, the stocking material will stretch accordingly and will thereafter return to its normal illustrated shape.

It will be obvious to those skilled in the art that many variations may be made in the exact construction shown without departing from the spirit and scope of this invention.

I claim:

1. A live bait carrier comprising
a container having an opening therein,
the part of said container surrounding said opening being substantially rigid,
a cover of resiliently stretchable fabric,
means attaching said cover to said container over said opening,
said cover having an access opening therein,
spring means yieldably causing said fabric to close said access opening whereby to prevent escape of live bait from said container,
said spring means comprising first and second springs attached to respective portions of said fabric on opposite sides of said opening,
first means for tensioning said first spring endwise,
this tensioning means also tensioning the ends of said first spring in a first direction away from said second spring,
second means for tensioning said second spring endwise,
said second means also tensioning the ends of said second spring in a direction opposite to said first direction to cause said portions to overlap each other and to yieldably close said opening.

2. A live bait carrier as defined in claim 1 wherein said springs cause the portion of said fabric intermediate said springs and the edge of said opening to pucker whereby to substantially close said opening to prevent said bait from moving into said opening and to prevent injury to any of said bait caught between said overlapping portions.

3. A live bait carrier as defined in claim 1 wherein said first spring is located above said second spring,
said first tensioning means comprising means attaching said ends of said first spring to said container above said opening and said second tensioning means comprising means attaching said ends of said second spring to said container below said opening.

* * * * *